United States Patent
Honaker

(10) Patent No.: US 9,725,052 B1
(45) Date of Patent: Aug. 8, 2017

(54) LICENSE PLATE MOUNTING BRACKET FOR VEHICLES HAVING MESH OR HORIZONTAL GRILLES

(71) Applicant: Ernest R. Honaker, Kahului, HI (US)

(72) Inventor: Ernest R. Honaker, Kahului, HI (US)

(73) Assignee: Ernest R. Honaker, Kahului, Honolulu, HI (US)

( * ) Notice: Subject to any disclaimer, the term of this patent is extended or adjusted under 35 U.S.C. 154(b) by 0 days.

(21) Appl. No.: 15/137,932

(22) Filed: Apr. 25, 2016

(51) Int. Cl.
| | | |
|---|---|---|
| A47K 1/00 | (2006.01) | |
| B60R 13/10 | (2006.01) | |
| F16B 2/12 | (2006.01) | |
| F16B 2/06 | (2006.01) | |
| F16B 35/00 | (2006.01) | |

(52) U.S. Cl.
CPC ............ *B60R 13/105* (2013.01); *F16B 2/065* (2013.01); *F16B 2/12* (2013.01); *F16B 35/005* (2013.01)

(58) Field of Classification Search
CPC .......... B60R 13/105; F16B 2/12; F16B 2/065; F16B 35/005
See application file for complete search history.

(56) References Cited

U.S. PATENT DOCUMENTS

| | | | | |
|---|---|---|---|---|
| 1,403,073 A | * | 1/1922 | Eklof ..................... | B60R 13/105 40/209 |
| 1,913,773 A | * | 6/1933 | Scaplen ................ | B60R 13/105 40/209 |
| 2,098,432 A | * | 11/1937 | Roose ................... | B60R 13/105 40/203 |
| 3,509,653 A | * | 5/1970 | Hummel .................... | G09F 7/18 40/200 |
| 6,757,998 B1 | * | 7/2004 | Lucatorto ............. | B60R 13/105 40/200 |
| 7,401,427 B2 | | 7/2008 | Zander | |
| 7,752,785 B2 | | 7/2010 | Beer et al. | |
| 8,136,854 B2 | | 3/2012 | Rich | |
| 2015/0078861 A1 | * | 3/2015 | Heinz ....................... | G09F 7/18 411/368 |

FOREIGN PATENT DOCUMENTS

WO     2007030827 A2    3/2007

OTHER PUBLICATIONS

Scion xB Forum, http://www.clubxb.com/forums/scion-xb-appearance/16038-license-plate-re-location.html, Dec. 10, 2007, 7 pages.

(Continued)

*Primary Examiner* — Amy Sterling
(74) *Attorney, Agent, or Firm* — Leech Tishman Fuscaldo & Lampl; Kenneth D'Alessandro, Esq.

(57) ABSTRACT

A license plate mounting bracket for vehicles having horizontal grilles, includes a license plate holder coupled to a license plate holder mount that has an adjustable clamp that includes a first jaw and a second jaw. A male-to-female standoff includes an axial threaded hole at a female end thereof, a shoulder engaging a front end of the first jaw and a male threaded portion passing through the first jaw and engaging female threads in a hole in the second jaw. A horizontal stabilizing member is attached to the first jaw of both the first and second clamps to hold the first jaw of the first clamp in a fixed position with respect to the first jaw of the second clamp.

8 Claims, 3 Drawing Sheets

(56) References Cited

OTHER PUBLICATIONS

BMW 3-Series (E90 E92) Forum, "Look Ma "No Holes,"" http://www.e90post.com/forums/showthread.php?t =374893, Apr. 14, 2010, 9 pages.
Mark Ridgeway, Virginia License Plate Bracket Central, "Front License Plate Holder: New Tesla Model S No Drill," http://www.licenseplatebracketcentral.com/front-license-plate-holder-new-tesla-model-s-no-drill/, Mar. 18, 2016, 7 pages.
Tesla Forums, "(Yet Another) Permanent Front License Plate Solution (works for European plates too)," https://teslamotorsclub.com/threads/yet-another-permanent-front-license-plate-solution-works-for-european-plates-too.20469/, Aug. 22, 2013, 12 pages.

\* cited by examiner

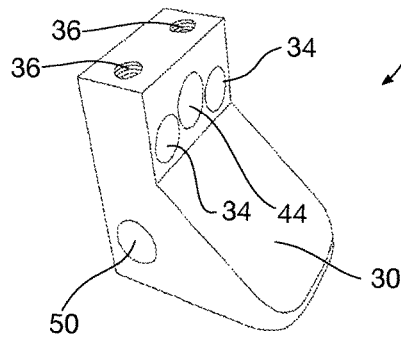
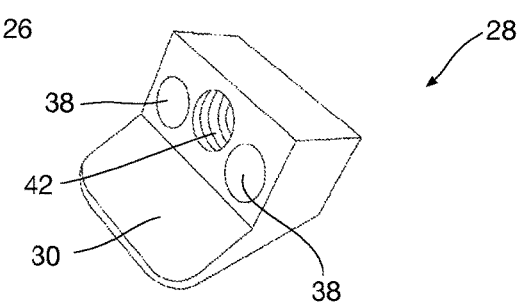
FIG. 2A     FIG. 2B
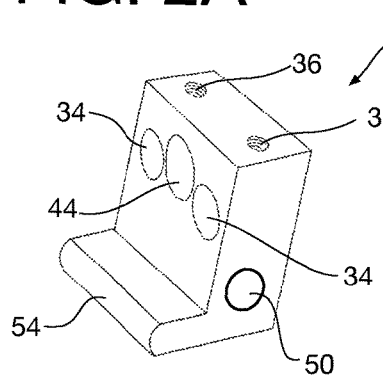
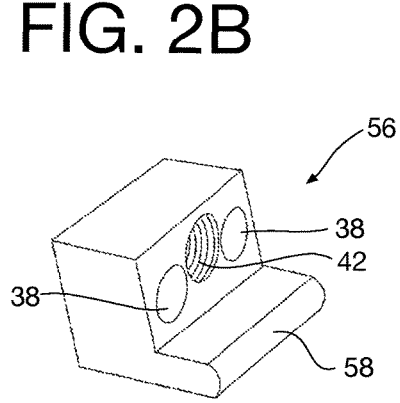
FIG. 3A     FIG. 3B
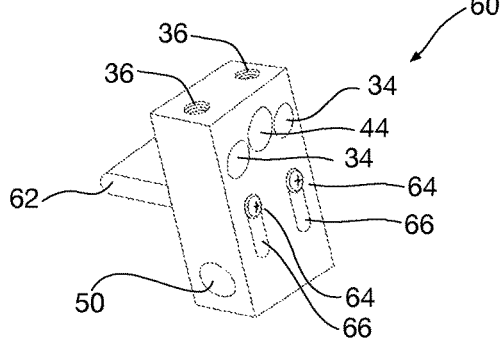
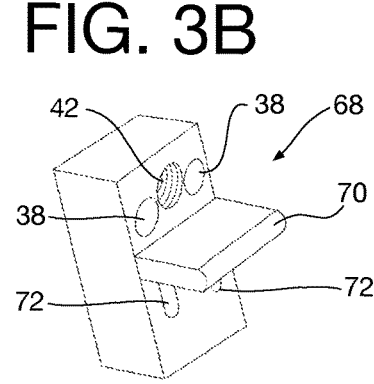
FIG. 4A     FIG. 4B

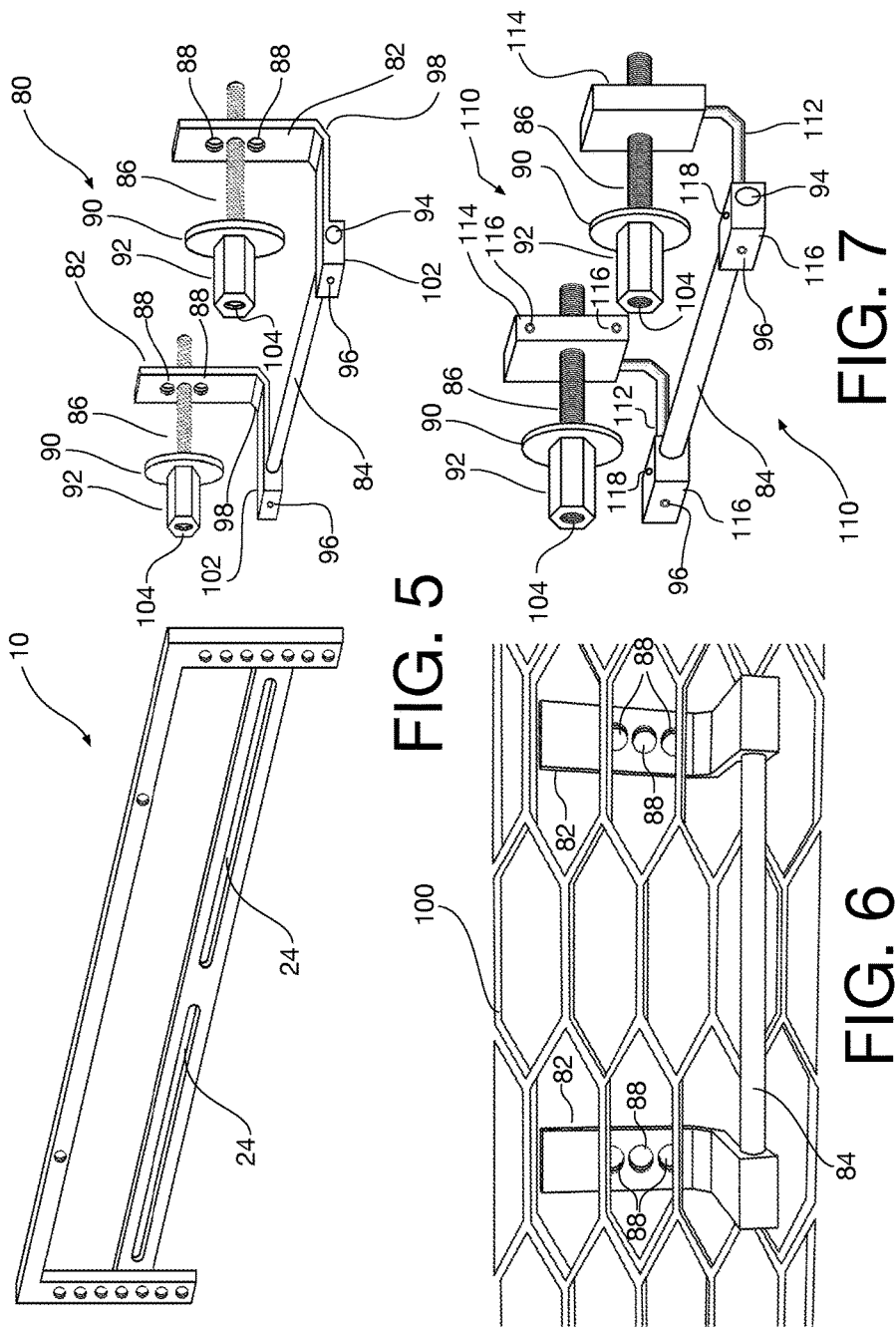

… … …

LICENSE PLATE MOUNTING BRACKET FOR VEHICLES HAVING MESH OR HORIZONTAL GRILLES

The present invention relates to automotive technology. More particularly, the present invention relates to a universal license plate mounting bracket for automobiles and other vehicles having mesh and horizontal grilles.

BACKGROUND

Most license plate brackets that are available to the public are made for specific automobile and other vehicle makes and models. This invention relates to a universal front license plate holder and license plate holder mount for automobiles and other vehicles.

Many countries require motor vehicles to have front and rear license plates. Installing license plates sometimes requires drilling holes into the exterior front and rear of the vehicle. Most car owners do not like the idea of drilling holes into their automobiles especially in the front bumper of the vehicle. Some try to avoid drilling holes by strapping down their license plates on the grill using zip ties. Others have resorted to placing their front license plate on the dashboard. The traffic laws of most states require all license plates to be securely fastened. Placing the license plate on a vehicle's dashboard may be illegal in some states but it is also unsafe.

Many automotive dealerships pre-drill front license plate holes into the front bumpers of the vehicles before delivery is made to comply with the license plate laws in their state. Some buyers have accepted this practice as normal. But many vehicle buyers prefer not to have holes drilled into their brand new vehicles. That being said, vehicle owners should have the option to choose whether or not they want to drill holes into their vehicles.

BRIEF DESCRIPTION

According to one embodiment of the present invention, a universal front license plate bracket includes a license plate holder and license plate holder mount for automobiles configured to mount on a horizontal style front grille or lower grille of an automobile or other vehicle. Mounting the bracket on the grille of the vehicle eliminates the need to drill holes into an automobile's front bumper to fasten a license plate. The license plate holder mount is a set of clamps that securely grips the automobile's horizontal grille. The license plate holder is fastened on to the license plate holder mount.

BRIEF DESCRIPTION OF THE DRAWING FIGURES

FIGS. 2A and 2B are, respectively, isometric views of front and rear angled jaws that may be employed in a license plate holder mount in accordance with the present invention.

FIGS. 3A and 3B are, respectively, isometric views of front and rear fixed L-jaws that may be employed in a license plate holder mount in accordance with the present invention.

FIGS. 4A and 4B are, respectively, isometric views of front and rear adjustable L-jaws that may be employed in a license plate holder mount in accordance with the present invention.

FIG. 5 is an isometric view of a disassembled license plate holder and license plate holder mount in accordance with another aspect of the present invention.

FIG. 6 is an isometric view showing a license plate holder mount of FIG. 5 engaged in a mesh grille of a vehicle.

FIG. 7 is an isometric view of an embodiment of a vertically-adjustable license plate holder mount.

DETAILED DESCRIPTION

Figure 1:
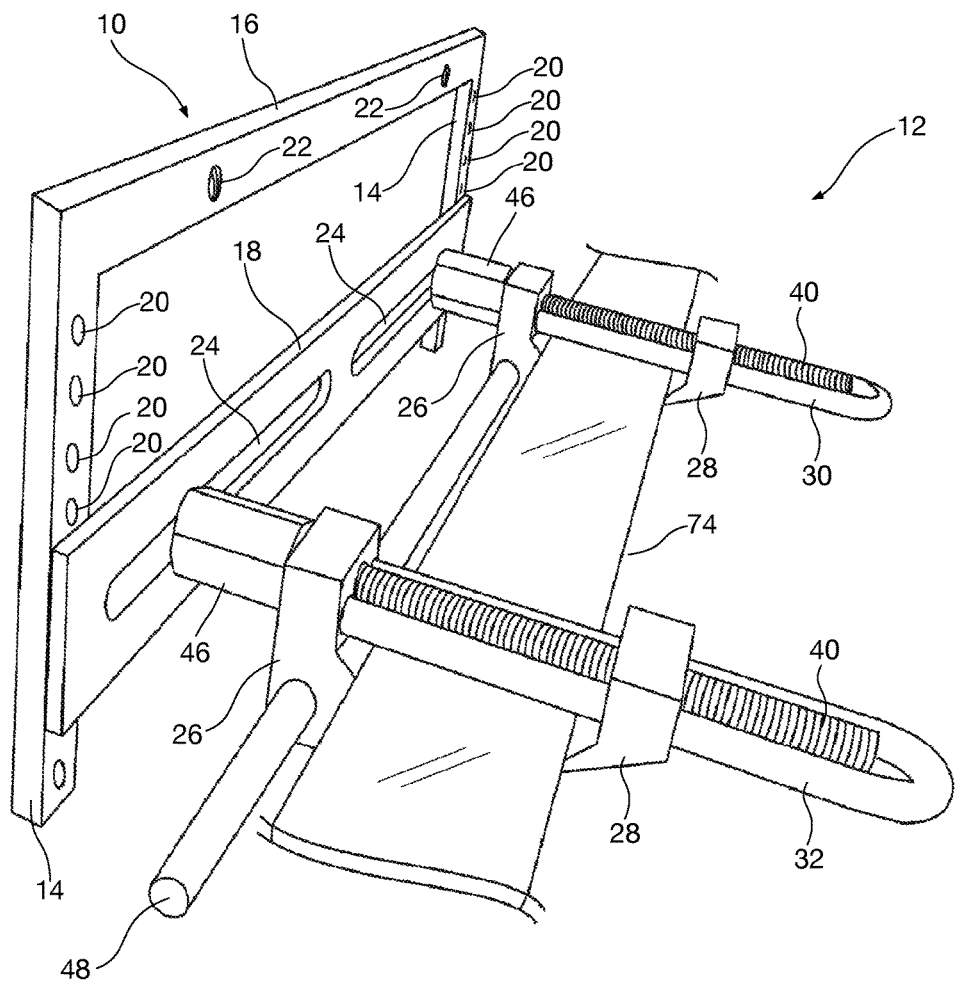
FIG. 1 is an isometric view of an assembled license plate holder and license plate holder mount in accordance with one aspect of the present invention.

Persons of ordinary skill in the art will realize that the following description of the present invention is illustrative only and not in any way limiting. Other embodiments of the invention will readily suggest themselves to such skilled persons.

Referring first to FIG. 1, an isometric view shows an assembled license plate holder 10 and license plate holder mount 12 in accordance with one aspect of the present invention. The license plate holder is where the automobile's license plate is fastened. The license plate holder 10 includes two vertical end sections 14 connected to a horizontal top section 16 and to a slide plate 18. The vertical end sections 14 and the horizontal top section 16 may be formed as a single unit. The ends of the slide plate 18 are fastened to the vertical sections 14 using, for example, machine screws and washers. The vertical sections 14 include a plurality of pre-drilled holes 20 for mounting the slide plate 18 to the vertical sections 14. These predrilled holes 20 allow the slide plate 18 to be positioned on the vertical sections 14 at different vertical positions depending on the desired height placement for the license plate. Threaded holes 22 located on the horizontal top section 16 of the license plate holder are used to fastened the license plate to the license plate holder 10 using two screws. Slide plate 18 includes slots 24 for mounting the license plate holder 10 to the license plate holder mount 12. Persons of ordinary skill in the at will appreciate that other configurations for license plate holder 10 are contemplated for use with the present invention, such as but not limited to a plate, a perforated plate, etc.

In the embodiment illustrated in FIG. 1, the license plate holder mount 12 includes a pair of gripping clamps, each of which include front angular shaped clamp jaws 26 and rear angular shaped clamp jaws 28 most easily seen, respectively, in FIGS. 2A and 2B. Both front angular shaped clamp jaws 26 and rear angular shaped clamp jaws 28 have an angled engagement face 30. The angular design of the front and rear angular shaped clamp jaws 26 and 28 ensures a secure grip onto the grille to prevent the jaws from slipping off and also accommodates various grille beam thicknesses. The front and rear angular shaped clamp jaws 26 and 28 of each gripping clamp are engaged on a U-track 32 The U-track 32 is engaged by holes 34 in the front angular shaped clamp jaw 26 of each gripping clamp and is rigidly attached to the U-track 32 using, for example, set screws threaded into holes 36 and tightened onto the U-track 32 in holes 34. The rear angular shaped clamp jaw 28 of each gripping clamp is slideably mounted on its U-track 32 through clearance holes 38. A male thread of a female-to-male standoff 40 is threaded into a threaded hole 42 in the rear angular shaped clamp jaw 28 and passes through clearance hole 44 in front angular shaped clamp jaw 26. The female-to-male standoff 40 is a threaded bolt having an axial female thread at the head end. The front angular shaped clamp jaw 26 rests against the front end 46 of the female-to-male standoff 40, which may be hexagonal in cross section to facilitate tightening the gripping clamp jaws by rotating the female-to-male standoff 40 to slide the rear angular shaped clamp jaw 28 along the U-track 32.

In the illustrative embodiment of the invention shown in FIG. 1, the two front clamp jaws 26 are mounted on a stabilizer bar 48 passed through transverse holes 50 in the two front clamp jaws 26. The two front clamp jaws 26 may be mounted on stabilizer bar 48 using set screws threaded into set-screw holes (not shown) communicating with holes 50 in the two front clamp jaws 26 to capture the stabilizer bar 48. This allows the separation between the two front clamp jaws 26 to be adjusted for individual grille geometries of various vehicles and to keep all of the gripping clamps parallel to one another.

According to one aspect of the present invention illustrated in FIGS. 3A and 3B, the front and rear clamp jaws may each be L-shaped. Instead of the angled faces of front and rear clamp jaws 26 and 28 of FIGS. 2A and 2B, the front clamp jaw 52 shown in FIG. 3A is an L-shaped fixed clamp jaw having a rearward-facing engaging edge 54 and rear clamp jaw 56 is an L-shaped fixed clamp jaw having a forward-facing engaging edge 58. The various features of the front clamp jaw 52 and rear clamp jaw 56 that are the same as features of the front and rear clamp jaws 26 and 28 of FIGS. 2A and 2B perform the same functions as those features present in the front and rear clamp jaws shown in FIGS. 2A and 2B and are referred to using the same reference numerals as the corresponding features of the front and rear clamp jaws 26 and 28 of FIGS. 2A and 2B.

According to an aspect of the present invention illustrated in FIGS. 4A and 4B, the front and rear clamp jaws may each be L-shaped, having vertically-adjustable forward-facing and rearward facing engaging edges. The front clamp jaw 60 shown in FIG. 4A is an L-shaped clamp jaw having a vertically-adjustable rearward-facing engaging edge 62. The rearward-facing engaging edge 62 is attached to the body of the front clamp jaw 60 by, for example, machine screws 64 engaging the rearward-facing engaging edge 62 through vertical slots 66.

Rear clamp jaw 68 is an L-shaped vertically-adjustable clamp jaw having a forward-facing engaging edge 70. The forward-facing engaging edge 70 is attached to the body of the rear clamp jaw 68 by, for example, machine screws (not shown) engaging the forward-facing engaging edge 70 through vertical slots 72. The various features of the front clamp jaw 60 and rear clamp jaw 68 that are the same as features of the front and rear clamp jaws 26 and 28 of FIGS. 2A and 2B perform the same functions as those features present in the front and rear clamp jaws shown in FIGS. 2A and 2B and are referred to using the same reference numerals as the corresponding features of the front and rear clamp jaws 26 and 28 of FIGS. The vertical positions of both forward-facing and rearward facing engaging edges 62 and 70 on the bodies of their respective clamp jaws may be independently adjusted by tightening the machine screws which may be positioned anywhere along the respective slots and tightened at a desired vertical location.

In all configurations shown in FIGS. 2A, 2B, 3A, 3B, 4A, and 4B, the front and rear clamp jaws can be positioned to engage a horizontal surface of the vehicle grille (e.g., grille 74 shown in FIG. 1) onto which the license plate holder mount 12 is mounted. The configuration shown in FIGS. 4A and 4B is most useful for mounting situations in which the front and rear surfaces of the grill are vertically offset from one another.

Most vehicle grille designs are either straight or curved. One function of the purpose of the U-track 32 is to keep each clamp set to face straight forward and parallel with each other during installation regardless of grille design. The U-track 32 also serves to prevent the threaded female-to-male standoff 40 from rubbing against the grille 74 by positioning the track such that the threaded female-to-male standoff 40 passes through the grille 74 at a position spaced apart from the grille structure.

The license plate holder 10 is attached to the license plate holder mount 12 by placing machine screws through the slots 24 in the slide plate 18 and threading them into axial female threads provided in the front ends 46 of the female-to-male standoffs 40. In accordance with standard mechanical practice, washers and/or lockwashers may be employed in this assembly.

As will be appreciated by persons of ordinary skill in the art, while the license plate holder mount 12 is shown in FIG. 1 employing one pair of gripping clamps, additional gripping clamps can be used depending on how many gripping clamps are needed to create a strong installation.

The license plate holder 10 and the license plate holder mount 12 are installed separately. The license plate holder mount 12 is installed first. Before installing the license plate holder mount 12 the distance between each front clamp jaw 26 on the stabilizer bar 48 is adjusted. The adjustment may advantageously place each front clamp jaw 26 against a vertical support on the horizontal beam of the vehicle grille because the point where the horizontal beam 74 and vertical support of the grille meet is the strongest section of the horizontal beam. The front clamp jaw 26 and rear clamp jaw 28 of each gripping clamp is then secured tightly in place on the stabilizer bar 48.

The license plate holder mount 12 is installed by choosing a single horizontal beam 74 on the lower or bumper grille of the front of the vehicle. The license plate holder mount 12 is positioned so that the rear clamp jaws 28 on each set of clamps can be inserted into the grille first. The license plate holder mount 12 is inserted through the grille and on top of the selected horizontal beam 74 until the rear clamp jaws 28 pass the horizontal beam 74 of the grille. Once each rear clamp jaw 28 is inserted past the horizontal beam 74 of the grille, each set of gripping clamps can be tightened by turning the female-to-male standoff 40 in a clockwise direction.

Once the license plate holder mount 12 is installed, the license plate holder 10 can be fastened to it. The license plate holder 10 is fastened to the slide plate 18 and onto the female end of the male-to-female standoff 40 on the license plate holder mount 12. Finally, the license plate may be fastened on to the license plate holder 10.

Referring now to FIG. 5, a disassembled license plate holder 10 and license plate holder mount 80 in accordance with another aspect of the present invention is described. The embodiment shown in FIG. 5 can be used with mesh grilles and multi horizontal beam grilles. The license plate holder may be the same or similar to the license plate holder 10 of the embodiment shown in FIG. 1 and will therefore be referred to using the same reference numerals used to designate elements of the license plate holder 10 of FIG. 1.

According to this aspect of the present invention, a license plate holder mounting bracket 80 includes metal L-shaped backings 82 connected to stabilizer rod 84, male-to-female standoffs 86 engaged in one of a plurality of vertically-spaced apart holes 88 in the vertical portion of the L-shaped backings 82, and large metal washers 90 seated against the front female ends 92 of the male-to-female standoffs 86. The plurality of threaded holes 88 allows the male-to-female standoff 86 to be mounted in a number of different vertical positions.

The L-shaped backings 82 are each connected to the stabilizer rod 84 by inserting the stabilizer rod through holes 94, and fastened using for example, set screws tightened against the stabilizer rod 84 through holes 96. The L-shaped backings 82 have an octagonal corner type of bend 98. An octagonal bend 98 allows the L-backing 82 to fit into very narrow opening when installed on a mesh or horizontal grille (mesh grille 100 is shown) as shown in FIG. 6. On the bottom section of the L-shaped backing 82 is a slide box 102 including the transverse through hole 94 that runs the width of the L-shaped backing 82. Each L-shaped backing 82 is secured on the stabilizer bar 84 by passing the stabilizer bar 84 through the hole 94 in slide box 102 and tightening the set screw in hole 96. Two or more L-backings 82 may be used to ensure a strong mounting of the license plate holder mounting bracket 80. The stabilizer rod 84 may be a round metal rod used to keep all L-shaped backings 82 parallel to one another. The L-shaped backings 82 need to be properly aligned so that the license plate holder 10 is straight after it is installed. A square cross section stabilizing rod may be employed for this purpose in [place of a round stabilizer rod 84.

Before installing the mounting bracket 80 each L-shaped backing 82 needs to be secured on the stabilizer bar 84 facing the same direction. With the backside of L-shaped backings 82 against the grille 100, the L-shaped backing 82 is tilted backward so that the vertical top section can be inserted into the grille 100. Once the top section is inserted and behind the grille 100 as shown in FIG. 6, the L-shaped backing 82 is then tilted back to its upright position. The male-female standoffs 86 with washers 90 installed are then inserted into the grill 100 and threaded into one of threaded holes 88 on the top section of the L-backing 82. Once the mounting bracket 80 is tightly secured, the license plate holder 10 can be fastened into threaded holes 104 at the female end 92 of the male-female standoff 86 through slots 24.

Referring now to FIG. 7, an alternate embodiment of license plate holder mounting bracket 110 retains the L-Shaped backing design having an octagonal corner type of bend. The L-shaped backing which receives the male-female standoff includes an L-shaped rod 112. A vertical slide box 114 is mounted on the L-shaped rod 112 through a hole (not shown) and is tightened against the L-shaped rod 112 using set screws threaded into set screw holes 116. This allows the vertical slide box 114 to be vertically adjustable based on the size and design of the automobile grille 100. A horizontal slide box 116 is attached to the horizontal end of the L-shaped rod 112 by inserting the L-shaped rod into a hole (not shown) at the rear of the horizontal slide box 116 and tightening a set screw in hole 118. The various features of the embodiment of FIG. 7 that are the same as features of the embodiment shown in FIG. 5 perform the same functions as those features present in the embodiment shown in FIG. 5 and are referred to using the same reference numerals as the corresponding features of the embodiment shown in FIG. 5.

The license plate holders and license plate holder mounts disclosed herein can be formed from different materials, such as metals, including but not limited to, aluminum, steel and stainless steel, zinc, and plastics such as, but not limited to, ABS, polystyrene and high-density polypropylene. In addition, the embodiment of the present invention shown in FIG. 1 may be practiced using one clamp or two or more clamps. The embodiments of FIGS. 5 and 7 may be practiced using one L-shaped backing or two or more L-shaped backings.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A license plate mounting bracket for vehicles having horizontal grilles, comprising:
   a license plate holder;
   a license plate holder mount coupled to the license plate holder and including a first adjustable clamp including:
      a first jaw and a second jaw;
      a male-to-female standoff, the male-to-female standoff including an axial threaded hole at a female end thereof, the male-to-female standoff having a shoulder engaging a front end of the first jaw and a male threaded portion passing through the first jaw and engaging female threads in a hole in the second jaw; and
   a second adjustable clamp including:
      a first jaw and a second jaw; and
      a male-to-female standoff, the male-to-female standoff including an axial threaded hole at a female end thereof, the male-to-female standoff having a shoulder engaging a front end of the first jaw and a male threaded portion passing through a clearance hole in the first jaw and engaging female threads in a threaded hole in the second jaw; and
   a horizontal stabilizing member attached to the first jaw of both the first and second clamps to hold the first jaw of the first clamp in a fixed position with respect to the first jaw of the second clamp.

2. The license plate mounting bracket of claim 1 wherein the horizontal stabilizing member is a bar captured in holes running transversely through the first jaws of the first and second clamps.

3. The license plate mounting bracket of claim 1 wherein the horizontal stabilizing member is captured in the holes running transversely through the first jaws of the first and second clamps by set screws.

4. The license plate mounting bracket of claim 1, further comprising:
   a horizontally-oriented slide plate coupled to opposite sides of the license plate holder, the slide plate having at least one horizontal slot aligned with the female threads in the male-to female standoff of the first through which machine screws couple the license plate holder to the license plate holder mount.

5. The license plate mounting bracket of claim 4 wherein the slide plate can be coupled to the license plate holder at a plurality of different vertical positions.

6. The license plate mounting bracket of claim 4 wherein the license plate holder includes a plurality of vertically-spaced-apart holes proximate to each side edge thereof for mounting the slide plate to the license plate holder at plurality of different vertical positions.

7. The license plate mounting bracket of claim 1 wherein the first jaw and second jaws of the first clamp have angled engagement faces.

8. The license plate mounting bracket of claim 1 wherein:
   the first jaw of the first clamp has a rearward-facing engaging edge; and the second jaw of the first clamp has a forward-facing engaging edge.

* * * * *